Oct. 9, 1945.    R. W. McOMIE    2,386,491
PROCESS FOR THE REGENERATION OF CONTACT MATERIALS
Filed May 1, 1944
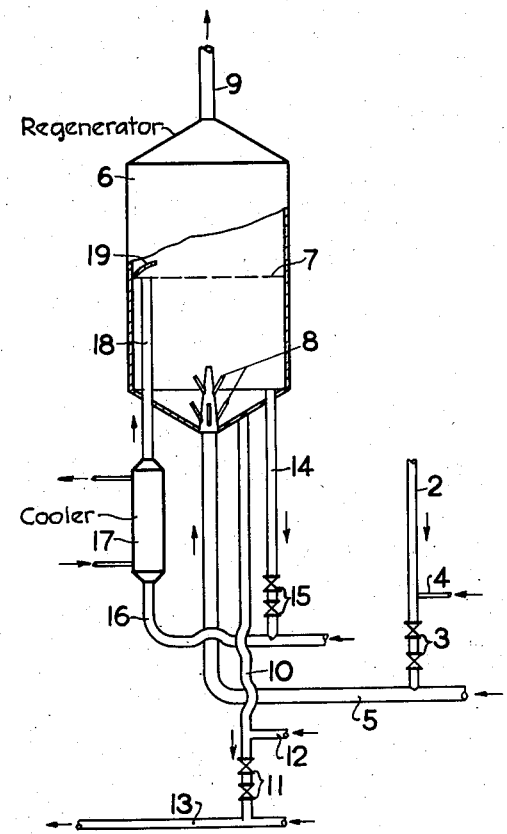
Inventor: Rulon W. McOmie
By his Attorney: C. J. Ott Patented Oct. 9, 1945

2,386,491

UNITED STATES PATENT OFFICE 2,386,491

PROCESS FOR THE REGENERATION OF CONTACT MATERIALS

Rulon W. McOmie, Wilmington, Calif., assignor to Shell Development Company, San Francisco, Calif., a corporation of Delaware Application May 1, 1944, Serial No. 533,558

10 Claims. (Cl. 196—52)

This invention relates to improvements in the method and apparatus for the removal of carbonaceous materials from solid finely divided contact materials by burning with air or other oxygen-containing gases.

The removal of carbonaceous materials, such as adsorbed oils, coloring matter, tars, coke, etc., from contact materials by burning with air or other oxygen-containing gases is often referred to in the art as regeneration, revivification, activation, and reactivation. For the purpose of the present specification all such processes wherein carbonaceous materials are removed from a solid contact material by burning are referred to by the single term "regeneration."

A wide variety of contact materials such as catalysts, adsorbents, decolorizing agents, treating earths, etc., are used in various treating, refining, and conversion processes in contact with carbonaceous materials. Most of such contact materials become ineffective after a period of use and must be periodically treated to restore their efficiency. This treatment often comprises a step of removing carbonaceous material from the contact agent by burning with air or other oxygen-containing gas. In general these various contact agents are easily damaged by overheating and many of them are damaged by contact with steam at elevated temperatures. It is necessary, therefore, that this burning or regeneration treatment be carried out under controlled conditions.

Considerable attention has been given particularly over the last few years, to regeneration treatments and various methods and improvements have been suggested. In one of the best and most widely used of these methods, the contact material is regenerated while in the so-called fluidized state. The regeneration of contact agents in a fluidized state is carried out in an apparatus known as a "fluid catalyst regenerator." The best and most common fluid catalyst regenerator is that known as the "bottom-draw-off fluid catalyst regenerator." In the bottom-draw-off fluid catalyst regenerator the finely divided contact material to be treated is introduced into the lower section of a regeneration chamber by means of a stream of oxygen-containing gas, usually air. The amount of gas introduced into the lower section of the regeneration chamber with the finely divided contact agent or otherwise, is regulated so that the finely divided contact agent undergoing regeneration is maintained in an aerated, free flowing, pseudo liquid state (fluidized state). The amount of gas is neither so little as to allow the finely divided solid to pack or cake, nor so great as to carry the finely divided contact material through the regeneration zone in suspension. Thus, in the regeneration there is a lower, comparatively dense, pseudo liquid phase and an upper gas phase separated by a definite interface. The regeneration gas "bubbles" up through the fluidized, finely divided contact agent and as the bubbles burst at the interface, a small amount of the finely divided solid is carried in suspension (pseudo gas phase) into the space above the so-called dense or fluidized phase.

In order to minimize "carryover" a considerable space is necessary in the regenerator above the interface to allow the major part of the suspended solids to settle. Thus, each regenerator is designed for operation at an optimum level which is the maximum level of the interface between the upper, light or pseudo gas phase, and the lower, dense, or pseudo liquid phase under normal operation. The space above the interface is known as the "disengaging" space. In order to reduce the disengaging space to a minimum, the regenerator is usually provided with internal cyclone separators within the disengaging space. The material collected in the internal cyclones discharges by means of a standpipe into the lower, pseudo liquid phase thereby to provide a "liquid" seal. As the name implies, the regenerated material is withdrawn from the bottom of the regenerator, usually through one or more standpipes (catastats).

The burning of the carbonaceous material from the contact agent generates a large amount of heat. In order to allow increased regeneration capacity and in order to prevent overheating of the contact agent in the regenerator, cooling means are usually provided. Generally this comprises a recycle cooler (heat exchanger). A portion of the partially regenerated contact agent is continuously recycled to an external cooler. The material cycled to the cooler is preferably withdrawn from near the center, lower section of the dense phase where the temperature would ordinarily reach a maximum. This not only allows maximum efficiency in the cooler, but also induces circulation in the fluidized phase. The portion of partially regenerated contact agent withdrawn for cooling (usually through a standpipe) is cycled through a suitable indirect heat exchanger by means of a stream of air, and the cooled mixture of finely divided contact agent and air is reintroduced into the main body of contact agent undergoing regeneration. In present practice, the mixture of cooled contact agent and air is discharged into the lower, dense phase at a point well below the center of the lower, dense phase and approximately at the same height as the point of introduction of the material to be regenerated. This point was chosen because it was believed that it would afford the most suitable distribution of the cooled material throughout the dense phase, would allow a minimum of the cooled material to reach the upper disengaging space, and would give a somewhat higher concentration of the cooled material in the lower center section of the dense phase where somewhat higher temperatures otherwise tend to maintain. By recycling a portion of the material through a cooler in the manner described, the temperature is maintained quite uniform throughout the dense or fluidized phase and good temperature control may be exercised.

It has now been found that considerable increased carbon burning capacity may be obtained in the regeneration of various contact materials in the fluidized state in bottom-draw-off fluid catalyst regenerators if certain alterations are made to allow a different circulation of the cooling medium (cooled partially regenerated material). According to the process of the invention, the apparatus is so modified and the operation is so carried out that the material at the interface is maintained at a lower temperature than that of the main body of material undergoing regeneration. Thus, there is created and maintained a temperature gradient. This is accomplished according to the preferred embodiment of the invention by discharging a cooled mixture of partially regenerated contact material and transport gas at or near the normal working level, i. e. the interface. This cooled material is concentrated at the interface. As the cooled material works its way down to the hotter portions of the dense phase and becomes itself heated, the interface is maintained at a lower temperature due to a constant supply of cool material. The oxygen-containing regeneration gas passing up through the fluidized bed of contact material is cooled upon contact with the cooled contact material at the interface. Thus, the temperature in the disengaging space is also lower than in the main body of fluidized contact material.

The primary advantage of the described method of operation is that higher regeneration temperatures in the fluidized bed may be employed while at the same time avoiding the phenomenon called "after-burning." After-burning consists of combustion of carbon monoxide with excess oxygen in the gas in the disengaging space. The flue gas entering the disengaging space contains considerable quantities of carbon monoxide as well as oxygen. If the temperature in the disengaging space is allowed to exceed a certain temperature, combustion of the carbon monoxide begins to take place at a fairly rapid rate, and since this combustion is highly exothermic there results an excessive temperature rise which can easily damage the contact material. The maximum temperature which can safely be allowed in the disengaging space is dependent upon the particular contact agent being regenerated and upon the concentration of oxygen in the flue gas, and may vary considerably. It is however usually in the order of 1050° F. In the described method of operation the gases entering the disengaging space are cooled by contact with a cooled portion of the contact material to such an extent that the temperature in the disengaging space remains below that causing after-burning. The cooled contact material supplied at or near the interface acts as a cool blanket preventing transfer of excessive heat from the dense phase to the disengaging space.

The cool portion of contact material may be discharged at the interface, just below the interface, or above the interface. As far as its function as a cooling agent for the gases entering the disengaging space is concerned, it is most advantageous to discharge the cooled material just above the interface. It quickly flows out over the interface. In this case the disengaging space may be found to have a somewhat higher concentration of suspended solids. This can be counteracted by employing a slightly decreased flow of regeneration gas.

In some cases where the disengaging space is operating at maximum capacity consistent with a fixed minimum efficiency, an increase in the concentration of suspended solids in the disengaging space may be undesirable. In such cases it may be most advantageous to introduce the cooled portion of contact material below the interface, preferably at one or more points just sufficiently below the interface that the concentration of suspended solids in the disengaging space is not appreciably increased. In any case the cooled material is discharged at one or more points well above the center of the fluidized bed or dense phase.

As pointed out above, in order to maintain the main portion of the material being regenerated in a fluidized state, the rate of flow of gases passing up through the fluidized bed must be controlled. In general, the density of the fluidized bed or dense phase may be varied over an appreciable range while maintaining a fluidized condition. The density is indirectly proportional to the rate of gas flow within this range. In general, relatively high density is desired because this allows a greater amount of material to be regenerated in a regenerator of given size and because the efficiency of the separation of suspended solids in the disengaging space is usually somewhat higher when operating with a fluid phase of relatively high density. In the preferred embodiment of the invention, a portion of the contact material undergoing regeneration is withdrawn from the lower section of the dense phase at or about the region of maximum temperature and cycled through a suitable heat exchanger by means of a transport gas. When the cycled material is discharged into the dense phase below the interface, the effect of the amount of the transport gas must also be considered. In general, therefore, discharge of the cooled material above the interface tends towards somewhat higher densities in the fluidized bed.

The gas used to cycle the cooled material may be air, flue gas, or a mixture of flue gas and air. Air is generally the most economical agent, but a gas (for instance, flue gas) having a lower concentration of free oxygen than that of the regeneration gas passed through the dense phase is more effective since it tends to reduce the concentration of oxygen in the disengaging space and consequently reduces the hazard of initiating after-burning when operating near maximum allowable temperatures.

The apparatus of the invention consists essentially of a bottom-draw-off fluid catalyst regenerator modified in such a manner as to make the above-described mode of operation possible. It will be apparent that the conventional bottom-draw-off fluid catalyst regenerator may be modified in a number of different ways to allow operation according to the above-described principles. Generally speaking it is necessary to provide a means for withdrawing a portion of the partially regenerated contact material from one or more points in the lower section of the fluidized or dense phase, to provide means for cooling the withdrawn material, and to provide means for supplying the cooled material back to the regeneration zone near the normal operating level. A suitable modification of the apparatus of the invention is illustrated in the attached drawing, wherein there is shown a simplified diagrammatic illustration of a modified bottom-draw-off fluid catalyst regenerator with certain of the more important connections. Referring to the drawing, the material to be regenerated is fed from any source through a standpipe or "catastat" 2 and suitable feeding mechanism such as slide valve 3. A gas may be passed into the standpipe via line 4 to prevent the finely divided solid from packing. The material to be treated passes into a line 5 wherein it is picked up by a stream of regeneration gas, for instance air, and carried into the lower section of the regeneration chamber 6. The regeneration chamber comprises a cylindrical section and a lower conical section. The top may be flat, dome-shaped or conical as shown. This chamber, according to its design, has a normal working level about as indicated by the broken line 7. As an example, the normal working level of a typical commercial regenerator having a diameter of 40 feet and a height of 35 feet between the conical sections is about 20 feet above the top of the lower conical section. The section below line 7 is the regeneration zone in which the contact material is in the dense or fluidized phase. The section above the interface (line 7) is the disengaging space. As indicated above, a plurality of cyclones are usually provided in the disengaging space. Since these are not essential and form no part of the invention they have been omitted in this illustration. The material entering the regeneration zone by line 5 is more or less evenly distributed within the regeneration zone by a distributing manifold 8. The flue gas leaves the regeneration chamber via line 9. The regenerated contact material is withdrawn from a point near the bottom via standpipe 10 and feeding mechanism, such as slide valves 11. Gas may be introduced into the standpipe 10 via line 12 to prevent the contact agent from packing. The regenerated contact material may be picked up by a stream of gas in line 13 and transported to a suitable storage bin, reactor, treater, or other place of disposal. A portion of the hot contact material is withdrawn from a point near the bottom of the dense phase by a standpipe 14 and suitable feeding mechanism such as slide valves 15. This material is picked up and transported through line 16, cooler 17 and line 18 by a stream of gas such as air or flue gas. The intake of line 14 may be, for example, within one or two feet of the top of the conical section or about at the same level as the distributing manifold 8. The outlet of line 18 is well above the center of the dense phase (in the typical regenerator mentioned above, at least 10 feet above the top of the conical section) and is preferably within one or two feet of the normal working level 7. In fact, if it is very close to the normal working level 7, the discharge can be made to enter either the dense phase or the vapor phase at pleasure by merely changing the level of the dense phase slightly. The outlet of line 18 is preferably provided with a deflector or baffle plate 19 to prevent the discharged material from being thrown upward in the disengaging space. The cooler 17 may be any suitable indirect heat exchanger such for instance as a series of tubes surrounded by a jacket in which steam, or oil is heated.

The process and apparatus of the invention are applicable and advantageous for the so-called reactivation, revivification, or regeneration of various mineral adsorbents, decolorizing agents, treating earths, catalysts and the like. Thus, they are particularly advantageous for the reactivation, or regeneration of various catalysts which have become contaminated during use by carbonaceous deposits such as tar, coke or the like. Since these various materials are regenerated while in the fluidized state it will be apparent that they must be in a finely divided state. In general, it is preferred to treat a material, at least 90% of which passes a U. S. Standard No. 100 sieve. However, material considerably coarser than this can be treated. Thus, for example, materials just passing a U. S. Standard No. 40 sieve can be treated, and if a large portion of finer material is present, even larger particles can be present.

The process and apparatus of the invention are particularly advantageous when applied to such of these contact agents as are easily damaged by overheating and/or damaged by contact with steam at elevated temperatures, and/or tend to form considerable quantities of carbon monoxide when subjected to a burning treatment at controlled temperatures. Thus, they are particularly advantageous for the regeneration of hydrocarbon-conversion catalysts of the clay type. In many hydrocarbon conversions and particularly the processes known as "catalytic cracking," "isoforming," "repassing," and "reforming," treated or modified earths and clays and also improved synthetic catalysts of this same type have found wide application. These materials are easily damaged by overheating and most of them, particularly the synthetic silica-alumina composites, are severely damaged by contact with steam at elevated temperatures such as encountered in regeneration. (See U. S. Patent 2,215,305.) These materials are, furthermore, frequently used in these various processes in a finely divided state.

When applied for the regeneration of clay-type catalysts in hydrocarbon conversion processes, such as catalytic cracking, the process and apparatus of the invention have the additional advantage of supplying the regenerated catalyst at a higher temperature than has hitherto been possible. Thus, by employing the present method of regeneration, not only is the carbon-burning capacity and regeneration rate of a regenerator of a given size increased, but a considerable saving of heat is possible, and higher conversions can be obtained with a given catalyst-to-oil ratio.

I claim as my invention:

1. In a process for the burning of carbonaceous material from a finely divided solid contact material by means of an oxygen-containing gas in a regenerating zone, wherein the contact material is maintained during said burning in a fluidized or turbulent dense phase separated by a catalyst interface from a disengaging space containing suspended therein a minor amount of said finely divided contact material, the improvement which comprises continuously introducing a cooled portion of said contact material into said regenerating zone substantially at the catalyst interface between said fluidized phase and said disengaging space above said fluidized phase, thereby maintaining said catalyst interface at a temperature below that of the main portion of said fluidized phase.

2. In a process for the burning of carbonaceous material from a finely divided solid contact material by means of an oxygen-containing gas in a regenerating zone wherein said contact material is maintained during said burning in a fluidized or dense phase separated by a catalyst interface from a dilute suspended phase of said contact material, the improvement which comprises continuously introducing a cooled portion of said contact material into said regenerating zone substantially at the catalyst interface between said fluidized phase and said dilute suspended phase, thereby cooling said catalyst interface without substantial reduction in temperature of the main body of said fluidized phase while eliminating the over-heating of said dilute suspended phase normally encountered in the absence of such cooling of said catalyst interface.

3. In a process for the burning of carbonaceous material from a finely divided solid contact material by means of an oxygen-containing gas in a regenerating zone, wherein said contact material is maintained during said burning in a fluidized or turbulent dense phase separated by a catalyst interface from a disengaging space containing suspended therein a minor amount of said finely divided contact material, the improvement which comprises eliminating the over-heating of said contact material suspended in said disengaging space without substantial reduction of the temperature of the main body of said fluidized phase by continuously introducing relatively cold partially regenerated contact material into said regenerating zone substantially at said catalyst interface.

4. In a process for the burning of carbonaceous material from a finely divided solid contact material by means of an oxygen-containing gas wherein the contact material is predominantly in a fluidized or dense phase separated by a catalyst interface from a dilute suspended phase of said finely divided contact material, the improvement which comprises continuously withdrawing a portion of the finely divided contact material from the body of the fluidized or dense phase, cooling said portion of withdrawn material, and returning the cooled material to said catalyst interface, thereby maintaining said catalyst interface at a lower temperature than the main body of said fluidized or dense phase.

5. Process according to claim 4 in which the withdrawn contact material is recycled through a cooler by means of flue gas.

6. Process according to claim 4 in which the withdrawn contact material is recycled through a cooler by means of a gas containing a lower concentration of free oxygen than that of the regeneration gas supplied to the fluidized or dense phase.

7. In a process for the catalytic cracking of hydrocarbon oils employing a finely divided synthetic silica-alumina cracking catalyst wherein the catalyst is regenerated by oxidation of carbonaceous materials therefrom while in a fluidized or dense phase separated by a catalyst interface from a dilute suspended phase of said catalyst, the improvement which comprises maintaining the catalyst interface at a temperature below that of the main portion of said fluidized or dense phase.

8. In a process for the catalytic cracking of hydrocarbon oils employing a finely divided catalyst of the clay type wherein the catalyst is regenerated by oxidation of carbonaceous materials therefrom while in a fluidized or dense phase separated by a catalyst interface from a dilute suspended phase of said catalyst, the improvement which comprises maintaining the catalyst interface at a temperature below that of the main portion of said fluidized or dense phase.

9. In a hydrocarbon conversion process employing a finely divided catalyst wherein the catalyst is regenerated by oxidation of carbonaceous materials therefrom while in a fluidized or dense phase separated by a catalyst interface from a dilute suspended phase of said catalyst, the improvement which comprises maintaining the catalyst interface at a temperature below that of the main portion of said fluidized or dense phase.

10. In a process for the regeneration of a finely divided catalyst by oxidation of carbonaceous deposits therefrom while in a fluidized or dense phase separated by a catalyst interface from a dilute suspended phase of said catalyst, the improvement which comprises maintaining the catalyst interface at a temperature below that of the main portion of said fluidized or dense phase.

RULON W. McOMIE.